US012391073B2

(12) United States Patent
Juette

(10) Patent No.: US 12,391,073 B2
(45) Date of Patent: Aug. 19, 2025

(54) VEHICULAR SENSING SYSTEM WITH TIRE PROFILE DETERMINATION

(71) Applicant: Magna Electronics Inc., Auburn Hills, MI (US)

(72) Inventor: Reinhard Juette, Mainhausen (DE)

(73) Assignee: Magna Electronics Inc., Auburn Hills, MI (US)

(*) Notice: Subject to any disclaimer, the term of this patent is extended or adjusted under 35 U.S.C. 154(b) by 150 days.

(21) Appl. No.: 18/314,193

(22) Filed: May 9, 2023

(65) Prior Publication Data

US 2023/0364948 A1  Nov. 16, 2023

Related U.S. Application Data

(60) Provisional application No. 63/364,420, filed on May 10, 2022.

(51) Int. Cl.
*B60C 11/24* (2006.01)
*B60W 50/00* (2006.01)
*B60W 50/14* (2020.01)

(52) U.S. Cl.
CPC .......... *B60C 11/246* (2013.01); *B60C 11/243* (2013.01); *B60W 50/0098* (2013.01); *B60W 50/14* (2013.01); *B60C 2200/04* (2013.01); *B60W 2050/143* (2013.01); *B60W 2050/146* (2013.01); *B60W 2420/403* (2013.01); *B60W 2420/408* (2024.01); *B60W 2422/70* (2013.01); *B60W 2530/20* (2013.01); *B60W 2556/10* (2020.02); *B60W 2556/45* (2020.02)

(58) Field of Classification Search
CPC .......... B60C 11/243; B60C 11/246; B60W 2422/70; B60W 2530/20
See application file for complete search history.

(56) References Cited

U.S. PATENT DOCUMENTS

| 5,550,677 | A  | 8/1996  | Schofield et al. |
| 5,670,935 | A  | 9/1997  | Schofield et al. |
| 5,949,331 | A  | 9/1999  | Schofield et al. |
| 6,124,886 | A  | 9/2000  | DeLine et al. |
| 6,386,742 | B1 | 5/2002  | DeLine et al. |
| 6,672,744 | B2 | 1/2004  | DeLine et al. |
| 6,690,268 | B2 | 2/2004  | Schofield et al. |
| 6,824,281 | B2 | 11/2004 | Schofield et al. |
| 6,877,888 | B2 | 4/2005  | DeLine et al. |
| 7,038,577 | B2 | 5/2006  | Pawlicki et al. |
| 7,289,037 | B2 | 10/2007 | Uken et al. |
| 7,720,580 | B2 | 5/2010  | Higgins-Luthman |

(Continued)

*Primary Examiner* — Mirza F Alam
(74) *Attorney, Agent, or Firm* — HONIGMAN LLP

(57) ABSTRACT

A vehicular driving assist system includes a sensor disposed at a vehicle and operable to capture sensor data. An electronic control unit (ECU) includes electronic circuitry and associated software, and the electronic circuitry includes a data processor for processing sensor data captured by the sensor. The vehicular driving assist system, via processing at the data processor of sensor data captured by the sensor, detects a tread of a tire of the vehicle. The vehicular driving assist system determines a tread depth of the tread of the tire. The vehicular driving assist system, responsive to the determined tread depth being below a threshold tread depth, generates a worn tire signal to alert a driver of the vehicle that that the determined tread depth is below the threshold tread depth.

27 Claims, 3 Drawing Sheets

(56) References Cited

U.S. PATENT DOCUMENTS

| | | |
|---|---|---|
| 7,855,755 B2 | 12/2010 | Weller et al. |
| 9,194,943 B2 | 11/2015 | Hassan et al. |
| 9,555,736 B2 | 1/2017 | Solar et al. |
| 10,933,798 B2 | 3/2021 | Juette |
| 11,442,168 B2 | 9/2022 | Nicke et al. |
| 12,106,583 B2 | 10/2024 | Potnis |
| 2017/0363515 A1* | 12/2017 | Poloni .................. G07C 5/0808 |
| 2018/0290501 A1* | 10/2018 | Oblizajek ............. G07C 5/0808 |
| 2020/0164695 A1* | 5/2020 | Kilaru ................... B60C 11/246 |
| 2021/0181064 A1* | 6/2021 | Kelly ..................... B60C 11/24 |
| 2022/0324266 A1* | 10/2022 | Alghooneh ........... B60C 11/246 |

\* cited by examiner

VEHICULAR SENSING SYSTEM WITH TIRE PROFILE DETERMINATION

CROSS REFERENCE TO RELATED APPLICATION

The present application claims the filing benefits of U.S. provisional application Ser. No. 63/364,420, filed May 10, 2022, which is hereby incorporated herein by reference in its entirety.

FIELD OF THE INVENTION

The present invention relates generally to a vehicle sensing system for a vehicle and, more particularly, to a vehicle sensing system that utilizes one or more sensors at a vehicle.

BACKGROUND OF THE INVENTION

Vehicle tires with low tread depth or tires with unevenly worn tire treads are hazardous to drivers of vehicles with such tire conditions. Poor tire conditions may result in reduced traction, increased braking distances, and ultimately collisions for the equipped vehicle.

SUMMARY OF THE INVENTION

A driving assist system utilizes one or more sensors disposed at a vehicle to capture sensor data representative of one or more tires of the vehicle. The sensor data is processed to determine a surface measurement or surface profile of a tread surface of the tire and to determine, based on the surface measurements, a condition of the tires of the vehicle. Based on the determined condition of the tires, a signal may be transmitted to the driver of the vehicle or to one or more systems of the vehicle so that, for example, the driver may perform maintenance on the vehicle or a driving assistance system may adjust control of the vehicle based on the determined condition of the tires.

For example, a driving assist system may include a sensor disposed at a vehicle and viewing at least a portion of a tire of the vehicle. The sensor captures sensor data. An electronic control unit (ECU) includes electronic circuitry and associated software, where the electronic circuitry includes a data processor for processing sensor data captured by the sensor to determine a surface measurement or profile of the tire of the vehicle (e.g., a depth of a tread of the tire). The system, responsive to processing the sensor data, determines a surface measurement of the tire of the vehicle, the surface measurement representative of at least a portion of a tread surface of the tire. Based on the determined surface measurement, the system determines a condition of the tread surface of the tire. The system communicates a signal indicative of the determined condition of the tread surface of the tire.

These and other objects, advantages, purposes and features of the present invention will become apparent upon review of the following specification in conjunction with the drawings.

DESCRIPTION OF THE PREFERRED EMBODIMENTS

Figure 1:
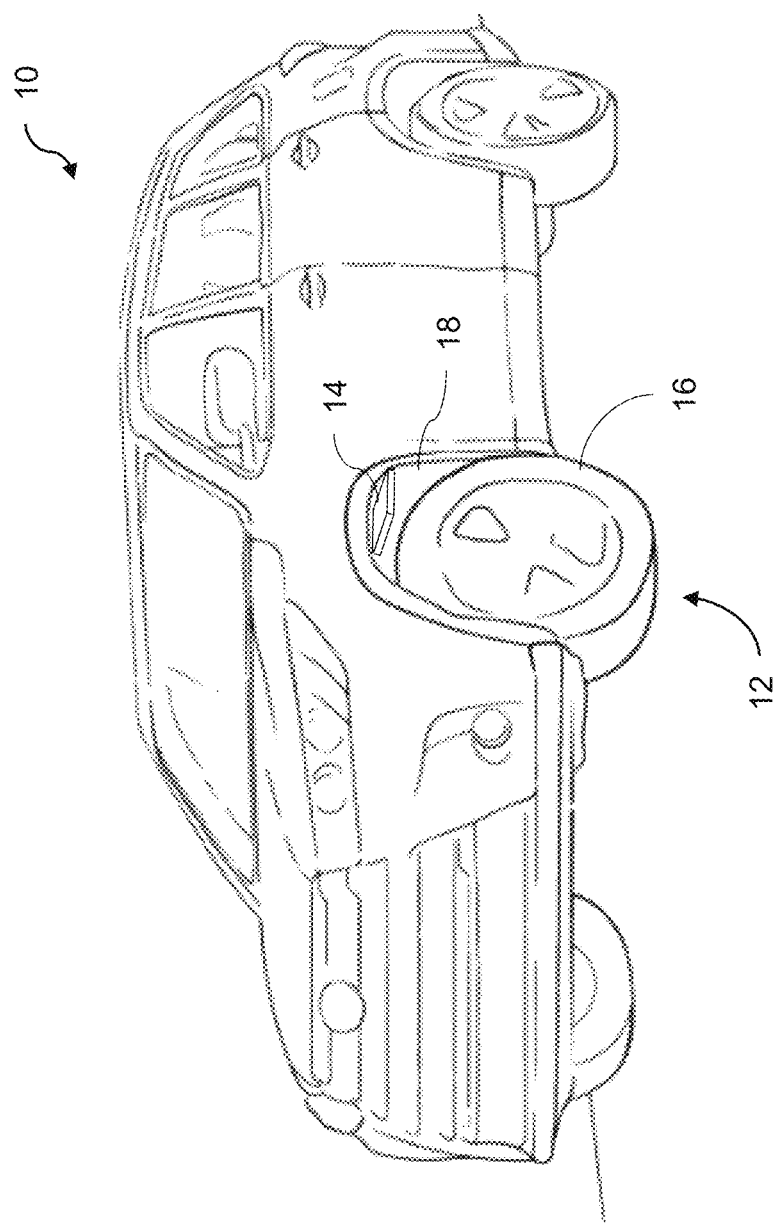
FIG. 1 is a perspective view of a vehicle with a sensing system for determining a condition of a tire tread surface of a tire of the vehicle.

A vehicle vision system and/or driver or driving assist system and/or object detection system and/or alert system operates to capture sensor data and/or images exterior of the vehicle and may process the captured sensor and/or image data to, for example, display images and to detect objects at or near the vehicle and in the predicted path of the vehicle, such as to assist a driver of the vehicle in maneuvering the vehicle in a rearward direction. The driving assist system includes a data processor or data processing system that is operable to receive sensor data from one or more sensors disposed at the vehicle and output a signal based on the processed sensor data. Optionally, the system includes an image processor or image processing system that is operable to receive image data from one or more cameras and provide an output to a display device for displaying images representative of the captured image data.

Referring now to the drawings and the illustrative embodiments depicted therein, a vehicle 10 includes a driving assist system 12 that includes at least one sensor 14 disposed at the vehicle so as to view or sense a tire 16 of the vehicle, where sensor data captured by the sensor 14 is processed to determine a condition of the tire 16. For example, the at least one sensor 14 may be disposed at a wheel well 18 of the vehicle and positioned within the wheel well so as to view a surface of the tire 16 (such as a tread surface and/or sidewall of the tire). The system 12 may include a plurality of sensors with at least one sensor 14 of the plurality of sensors at each tire 16 (such as at each wheel well 18 of the vehicle) so as to individually capture sensor data for each tire, or the system may include a sensor at fewer than all the tires of the vehicle (such as only at one tire or only at the front tires or only at the rear tires). The system 12 includes a control or electronic control unit (ECU) having electronic circuitry and associated software, with the electronic circuitry including a data processor or image processor that is operable to process sensor data captured by the sensor or sensors. The system 12, via processing at the ECU of captured sensor data, may determine a surface measurement or profile or contour to determine the condition of the tire 16. The data transfer or signal communication from the sensor to the ECU may comprise any suitable data or communication link, such as a vehicle network bus or the like of the equipped vehicle.

Tire conditions, such as tread depth or wear level, inflation level, and surface slickness, are critical for driver safety and vehicle performance. A tire having low tread depth (or high wear level), improper inflation level, or high surface slickness (due to wet conditions and/or low tread depth) may result in dangerous or unpredictable driving conditions and accelerated wear on the vehicle. For example, "bald" tires (i.e., tires having a low tread depth) may lead to bad driving characteristics and increased braking distance, which may lead to vehicle collisions.

Figure 2:
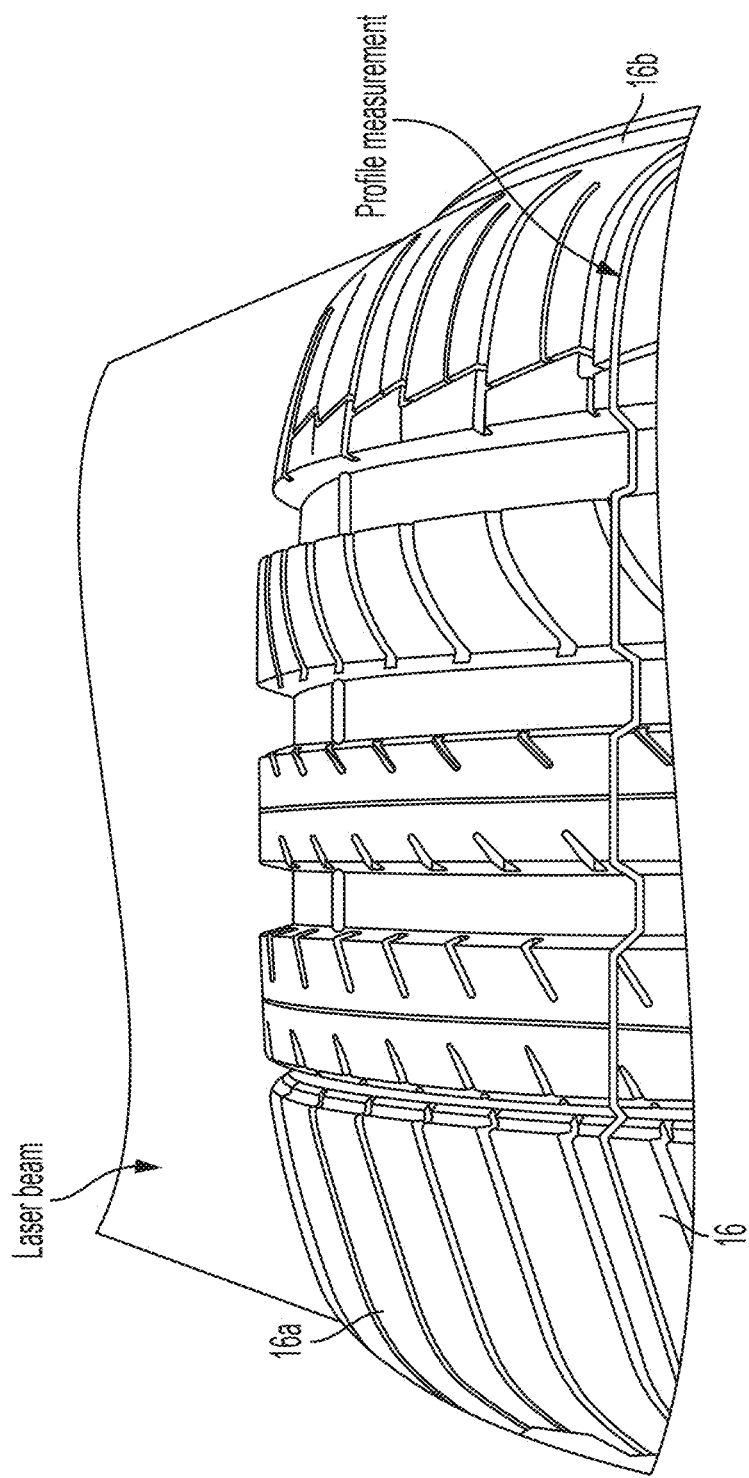
FIG. 2 is a perspective view of the sensing system sensing a surface profile of the tire.

The driving assist system 12 operates to sense or determine or measure a surface profile or surface contour of one or more tires of the vehicle to determine a condition of the tire 16. As shown in FIG. 2, the system 12 may use a laser measurement system or laser profiler 14 that emits a laser beam or laser line along a tread surface 16*a* and/or a portion of a sidewall 16*b* of the tire 16 to determine the surface profile or surface measurement of the tire 16. For example, the surface profile may comprise a two dimensional (2D) or three dimensional (3D) surface map of the tread surface 16*a* of the tire 16. Based on the surface profile of the tire 16, the system 12 may determine one or more measurements or conditions of the tire 16, such as tread depth and inflation level. For example, tread depth may be determined based on a difference between a highest measured point of the tread surface 16*a* and a lowest measured point of the tread surface 16*a*. Optionally, the system 12 may determine or estimate positions of ribs and grooves along the tread surface 16*a* and determine the tread depth as an average distance or depth between the ribs and grooves of the tread surface 16*a*.

Optionally, the system 12 may determine the condition of the tire without mapping or constructing a surface profile and may instead simply record measurements of the surface of the tire, such as tread depth, tread width, and the position on the tire of any anomalies or unexpected measurements. For example, the system may episodically determine a depth of one or more grooves of the tread surface 16*a*. As the tire wears, the depth of the one or more grooves of the tread surface 16*a* decreases. Thus, the system may determine the condition of the tire based on the measured depth of the groove of the tread surface 16*a* and/or based on a determined change in depth of the groove over time.

Measurement or sensing of the surface of the tire 16 may be performed when the tire is stationary or as the tire is rotating (such as at a relatively low rate), so that the laser measurement system 14 may capture accurate measurements of the surface of the tire 16. Thus, the measuring may be done at a slow speed, such as after starting the vehicle, or the laser measuring may be done after a stop with the engine running, such as when the vehicle is stopped at a traffic signal. Optionally, the system may be activated at the commencement of each ignition cycle or start of the vehicle so that the system determines the tire tread condition before the vehicle is driven along a road.

The laser measurement system 14 may be mounted in the wheel housing or wheel well 18 of the vehicle 10 or at any suitable position to view at least a portion of the tread surface 16*a* of the tire 16. For example, the laser measurement system 14 may be disposed at an upper inner surface of the wheel well 18. The laser measurement system 14 may be mounted at the wheel well 18 in a position or manner that avoids occlusion of the laser measurement system 14, such as positioned relative to a mud flap or screen such that the laser is protected from water, dust, mud, or other spray from the wheel. The laser may be protected within a sealed housing to further avoid damage from rock fall, water, dust, or the like. The system may include a washing or spraying device to spray the sensor (such as with pressurized washer fluid provided from a washer fluid reservoir of the vehicle) to clean debris or dirt from the sensor, such as episodically when the vehicle is started and the sensor is sensing the tire condition.

Based on the determined surface profile or surface measurements, the system 12 determines one or more conditions of the tire 16, such as a depth of the tire treads, an inflation level, a surface slickness, an alignment of the wheels, an overall health status of the tires, or the like. For example, the surface measurements may indicate a series of tread depths of the tire 16 across a portion of the tire tread surface 16*a* and, based on the tread depths, the system may determine the condition of the tire tread surface.

When the measured tread depths are lower or shallower than they should be (such as lower than a manufacturer's recommended level or lower than a threshold tread depth), this may indicate a tire condition of low tread depth or increased wear. When the measured tread depths are uneven (i.e., when tread depths at one portion of the tire tread surface are lower or shallower than tread depths at another portion of the tire tread surface), this may indicate that the tires are improperly inflated or that the tires are misaligned. When tires are overinflated, they tend to wear out more quickly at a central portion of the tread surface 16*a* and underinflated tires tend to wear out more quickly at outer, shoulder portions of the tread surface 16*a*. Misaligned tires tend to wear out more quickly at inner or outer portions of the tread surface 16*a*.

Further, inflation of the tire may be determined based on measurement of the sidewall of the tire 16*b*. For example, when the tire is underinflated, the sidewall 16*b* may compress or expand outward or outboard of the tread surface 16*a*. Thus, based on a measurement of the radial position of the sidewall 16*b* compared to an edge of the tread surface 16*a*, the system may determine that the tire is underinflated.

Additionally, the surface measurements of the tire tread surface 16*a* may indicate presence of a foreign object at the tire 16, such as a nail that has punctured the tire. For example, the system may detect that a portion of the measured surface profile of the tire is raised or extends from the tread surface 16*a*. The surface measurements may also indicate presence of a lubricant or slick coating at the tire 16, such as water, snow, ice, or mud, such as by the laser measurement system 14 determining a refractive or reflective quality of the surface of the tire.

Because the determined conditions of the tire may be indicative of dangerous or potentially dangerous situations that should be brought to the attention of the driver, the system 12 may transmit a signal to the driver of the vehicle or to one or more other systems at the vehicle based on the determined condition of the tire. For example, the system 12 may communicate a signal to the driver (through a visual or audio message or alert at a display of the vehicle) based on the determined tire condition, such as a signal indicating that the tires are worn and require replacement. For example, the system may generate an alert signal when the tires are worn past a threshold level (e.g., when the tread depth is below a threshold tread depth or when the tread depth decreases by a threshold amount from a default or initial tread depth). The system may generate the alert signal when the tread depth is below any suitable threshold tread depth, such as when the tread depth is less than 0.25 inches, less than 0.1875 inches, less than 0.125 inches, less than 0.0625 inches and the like. The signal may optionally indicate that the wheels are misaligned or improperly inflated, that a foreign object has punctured the tire, that hazardous driving conditions have caused a slick coating to form at the tire, and any other indication related to the determined condition of the surface of the tire. Optionally, the system may determine the condition of the tires of the vehicle and communicate the determined condition to the driver responsive to a user input from the driver, such as via an input within the vehicle or at a mobile device in communication with the system and requesting notice of the condition of the tires.

Optionally, the system may generate one or more different signals or alerts based on the determined condition of the tire. For example, in response to determining that the tread depth of the tire is below a threshold tread depth, the system generates a worn tire signal to alert the driver that the tires are worn. The worn tire signal may include a message or recommendation to the driver to replace or service the one or more worn tires. In response to determining that the tread surface of the tire is unevenly worn, the system may generate an uneven wear signal to alert the driver to the uneven wear of the tire. The uneven wear signal may include a message or recommendation to the driver to replace, service, inflate or rotate (i.e., move the tire to a different wheel position at the vehicle) the one or more unevenly worn tires. In response to detecting presence of a foreign object at the tire, the system may generate a tire puncture signal to alert the driver that the tire has been or is likely to have been punctured, and the signal may include a message or recommendation to replace or service the one or more punctured tires. In response to determining presence of a coating at the tire, the system may generate a hazardous driving condition signal to alert the driver to presence of moisture or snow at the road creating a hazardous driving condition. The hazardous driving condition signal may include a message or recommendation that the driver proceed with caution while continuing to operate the vehicle.

Visual signals or alerts may be provided to the driver via one or more display screens or illuminated icons at the interior cabin of the vehicle and/or audio alerts may be provided to the driver via one or more speakers of the vehicle. Optionally, the system may communicate the signals or alerts to a remote server in communication with the vehicular system and, in response to the communicated signals, a mobile device of the driver (that is in wireless communication with the remote server) may generate alerts to the driver. Optionally, the determined conditions of the tires of the vehicle may be viewable by the driver of the vehicle at a graphical user interface (GUI) or dashboard. For example, the driver may view the GUI at a display screen of the vehicle and the GUI may include graphical representations of the vehicle tires and the determined conditions (e.g., tire inflation level, tire tread wear level, presence of any foreign objects at the tire, road slickness based on presence of a coating at the tire, and the like).

Optionally, the system 12 may transmit the signal to another system of the vehicle 10, such as an advanced driving assist system (ADAS) of the vehicle so that the system may adjust its operation or control of the vehicle based on the determined tire condition. For example, an ADAS of the vehicle may control the vehicle more cautiously or react to other vehicle conditions differently based on the determined tire condition. For example, when the system determines that the tires are worn, the driving assist system may commence braking at an earlier time to accommodate the potential reduced traction of the worn tires. Optionally, for an adaptive cruise control system or collision avoidance system or the like, the system may set an appropriate gap or spacing between the equipped vehicle and a leading vehicle based in part on determination of the tire tread. For example, when the system determines that the tire tread is worn by at least a threshold amount, the system may increase the gap or spacing between the equipped vehicle and the leading vehicle to allow for additional time to slow or stop the equipped vehicle. That is, a system of the vehicle that autonomously or semi-autonomously controls operation of the vehicle (or that controls a system, such as a steering system or braking system, of the vehicle) as the vehicle travels along a road may adjust one or more control parameters (such as following distance, force applied when braking, or timing when performing turning maneuvers) of the vehicle based on the signal indicative of the condition of the vehicle tires. The vehicular control system may dynamically adjust the control parameter based on the level of wear of the tire or the control system may only adjust the control parameter when the level of wear is determined to be greater than a threshold level of wear. Thus, the determined tire condition may provide important information regarding the driving performance or maintenance condition of the vehicle and the driver of the vehicle and/or systems of the vehicle may adjust control of the vehicle based on the determined tire condition.

Optionally, the system 12 may transmit the signal representative of the determined tire condition to a remote user or to the remote server. For example, the vehicle may be a fleet vehicle (such as a delivery vehicle) where management or maintenance of the vehicle is controlled by a singular or central fleet manager. The fleet manager may receive the signal representative of a low tire tread depth and schedule tire replacement for the vehicle. Optionally, the remote server may communicate with the mobile device of the user so that the user may receive communications related to the condition of the tires of the vehicle via, for example, an application operating at the mobile device or a text message received at the mobile device.

Optionally, the system 12 may store target values for different measurements or characteristics of the tire 16 and compare measured values of the surface profile to the target values to determine the condition of the tire 16. For example, the system 12 may store an original or initial tread depth (i.e., the tread depth of the tire when initially installed at the vehicle) and a minimum or threshold tread depth so that the system may track total tread loss over time and issue the signal to the driver of the vehicle when the tread depth is below the threshold level. The initial tread depth may be measured by the system and stored in memory, or the initial tread depth may be stored in memory based on user input when the tire is installed at the vehicle.

Optionally, to determine the condition of the tire 16, or to determine whether the condition of the tire 16 is abnormal, the system 12 may determine a current surface profile or current surface measurement of the tire 16 and compare it to a baseline or stored or expected or historical surface profile or surface measurement of the tire 16. For example, the system may determine that a portion of the tire 16 is wearing faster than another portion of the tire (such as when a tread depth at one portion or region of the tire has a greater change over time than a tread depth at another portion or region of the tire) based on the comparison between the current surface profile and the historical surface profile.

Optionally, the system may determine surface measurements for more than one tire at the vehicle (such as all tires at the vehicle or only the rear or only the front tires of the vehicle) and compare the surface measurements of the individual tires. The condition of one tire may be determined based on the comparison of the individual tires. For example, the condition of the one tire may indicate that it has a higher wear (e.g., lower tread depth) than other tires. This may be useful when determining when to rotate the tires of the vehicle as the determined condition of the individual tires may indicate, for example, that the front tires have different wear levels compared to the rear tires.

Thus, the system provides a driving assist system that determines the profile depth of a vehicle tire with a laser beam so that dangerously worn tires can be avoided. If the system measures a profile lower than a defined limit, the system may send a signal or message to the driver indicating that maintenance is required.

Figure 3:
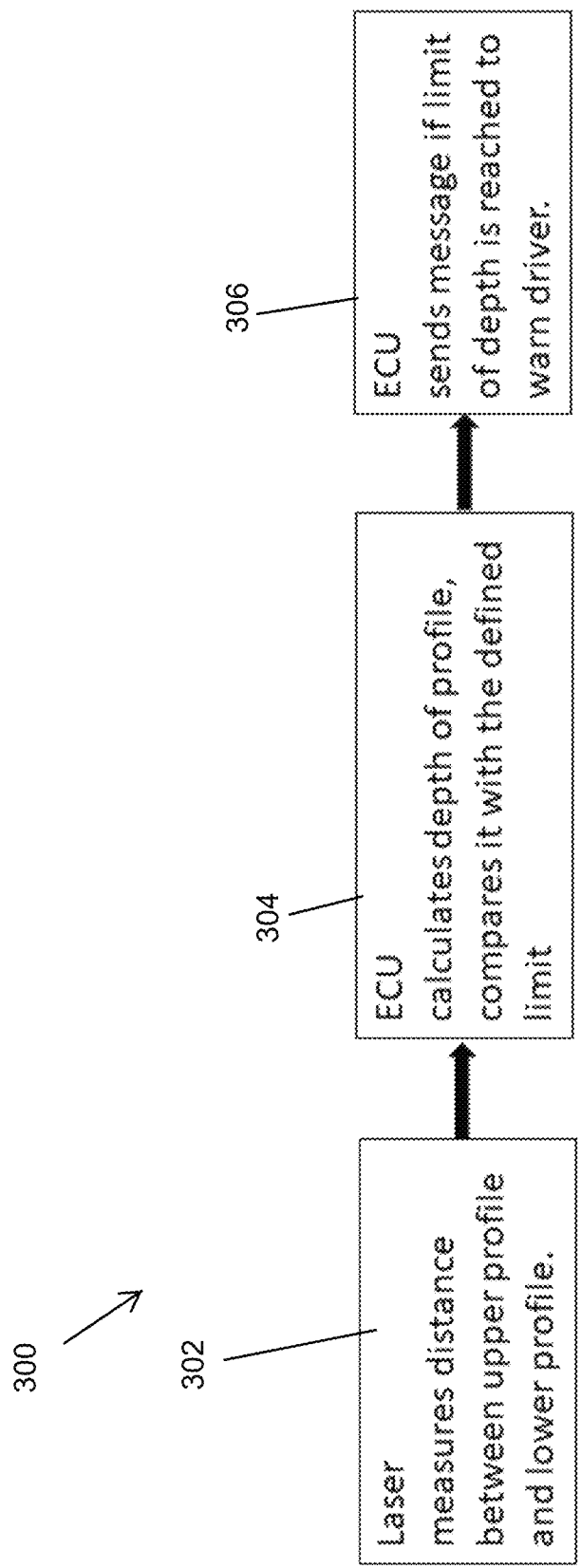
FIG. 3 is a flowchart of an example method of operating the sensing system to determine that the surface profile of the tire includes a tire tread depth below a threshold depth value.

For example, FIG. 3 shows an example method 300 of operating the system 12 to determine that the profile depth of a vehicle's tire tread is below a threshold limit. At operation 302, the system 12 operates the laser profiler 14 to measure a surface contour of the tire of the vehicle, which may include measuring a distance between an upper profile and a lower profile of the tread surface of the tire. At operation 304, the system 12 determines, based on the captured measurement, the depth of the profile and compares the determined depth with the defined limit or threshold depth value. At operation 306, based on the determined depth being below the threshold depth value, the system 12 communicates a message to warn the driver of the low tire tread depth.

The system may include an ECU that has a processor for processing data captured by the sensor, which may comprise an imaging sensor or a non-imaging sensor, such as a laser sensor or lidar sensor or the like. The sensor or sensors may comprise any suitable sensor, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least one million photosensor elements or pixels or at least three million photosensor elements or pixels or at least five million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

The processor and camera of the system may utilize aspects of the systems described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 7,855,755; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are hereby incorporated herein by reference in their entireties.

The system may utilize other types of sensors, such as radar sensors or imaging radar sensors or lidar sensors or the like, and the sensing system may utilize aspects of the systems described in U.S. Pat. Nos. 10,866,306; 9,954,955; 9,869,762; 9,753,121; 9,689,967; 9,599,702; 9,575,160; 9,146,898; 9,036,026; 8,027,029; 8,013,780; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 7,053,357; 6,919,549; 6,906,793; 6,876,775; 6,710,770; 6,690,354; 6,678,039; 6,674,895 and/or 6,587,186, and/or U.S. Publication Nos. US-2019-0339382; US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular driving assist system, the vehicular driving assist system comprising:
a sensor disposed at a vehicle equipped with the vehicular driving assist system, wherein the sensor is operable to capture sensor data;
an electronic control unit (ECU) comprising electronic circuitry and associated software;
wherein the electronic circuitry of the ECU comprises a data processor for processing sensor data captured by the sensor;
wherein the vehicular driving assist system, via processing at the data processor of sensor data captured by the sensor, detects a tread of a tire of the vehicle;
wherein the sensor is mounted at a wheel well of the vehicle, and wherein the sensor comprises a laser sensor that emits a laser beam toward the tread of the tire of the vehicle and that captures sensor data representative of reflection of the laser beam off the tread of the tire;
wherein the vehicular driving assist system determines a tread depth of the tread of the tire; and
wherein the vehicular driving assist system, responsive to the determined tread depth being below a threshold tread depth, generates a worn tire signal to alert a driver of the vehicle that the determined tread depth is below the threshold tread depth.

2. The vehicular driving assist system of claim 1, wherein the vehicular driving assist system, based on the determined tread depth of the tread of the tire, determines that the tread of the tire is unevenly worn.

3. The vehicular driving assist system of claim 2, wherein the vehicular driving assist system, responsive to determination that the tread of the tire is unevenly worn, generates an uneven wear signal to alert the driver that the tread of the tire is unevenly worn.

4. The vehicular driving assist system of claim 1, wherein the vehicular driving assist system, based on the determined tread depth of the tire, determines presence of a foreign object at the tread of the tire.

5. The vehicular driving assist system of claim 4, wherein the vehicular driving assist system, responsive to determination of the foreign object at the tread of the tire, generates a tire puncture signal to alert the driver that the tire has been punctured.

6. The vehicular driving assist system of claim 1, wherein the vehicular driving assist system, via processing at the data processor of sensor data captured by the sensor, determines presence of a coating at the tread of the tire.

7. The vehicular driving assist system of claim 6, wherein the vehicular driving assist system, responsive to determination of the coating at the tread of the tire generates a hazardous driving condition signal to alert the driver to a hazardous driving condition.

8. The vehicular driving assist system of claim 1, comprising a plurality of sensors disposed at the vehicle, wherein each sensor of the plurality of sensors is operable to capture sensor data, and wherein the vehicular driving assist system, via processing at the data processor of sensor data captured by the plurality of sensors, determines a respective tread depth of a respective tread of each respective tire of a plurality of tires of the vehicle.

9. The vehicular driving assist system of claim 8, wherein the vehicular driving assist system determines that the determined tread depth of the respective tread of one tire of the plurality of tires is below the threshold tread depth based on a difference between the determined tread depth of the respective tread of the one tire of the plurality of tires and the determined tread depth of the respective tread of another tire of the plurality of tires being greater than a threshold difference.

10. The vehicular driving assist system of claim 1, wherein the vehicular driving assist system determines that the determined tread depth is below the threshold tread depth based on a difference between the determined tread depth and a historical tread depth of the tread of the tire stored in memory being greater than a threshold difference.

11. The vehicular driving assist system of claim 1, wherein the vehicular driving assist system communicates the worn tire signal to a remote server in wireless communication with the vehicular driving assist system.

12. The vehicular driving assist system of claim 11, wherein, based on the worn tire signal communicated to the remote server, a mobile device of the driver that is in wireless communication with the remote server alerts the driver that the determined tread depth is below the threshold tread depth.

13. The vehicular driving assist system of claim 1, wherein the worn tire signal comprises a visual or audible alert at an interior portion of the vehicle.

14. The vehicular driving assist system of claim 1, wherein the vehicular driving assist system comprises an advanced driving assist system (ADAS) that is operable to at least partially control the vehicle as the vehicle travels along a road, and wherein, based on the determined tread depth being below the threshold tread depth, the ADAS adjusts control of the vehicle as the vehicle travels along the road.

15. The vehicular driving assist system of claim 1, wherein the vehicular driving assist system, via processing at the data processor of sensor data captured by the sensor, determines a profile of the detected tread, and wherein the vehicular driving assist system determines the tread depth of the tread of the tire based on a difference between a highest surface measurement along the determined profile and a lowest surface measurement along the determined profile.

16. A vehicular driving assist system, the vehicular driving assist system comprising:
a camera disposed at a vehicle equipped with the vehicular driving assist system, wherein the camera is operable to capture image data, and wherein the camera views a tread of a tire of the vehicle;
wherein the camera is mounted at a wheel well of the vehicle;
an electronic control unit (ECU) comprising electronic circuitry and associated software;
wherein the electronic circuitry of the ECU comprises an image data processor for processing image data captured by the camera;
wherein the vehicular driving assist system, via processing at the image data processor of image data captured by the camera, detects the tread of the tire of the vehicle;
wherein the vehicular driving assist system determines a tread depth of the tread of the tire;
wherein the vehicular driving assist system, responsive to the determined tread depth being below a threshold tread depth, generates a worn tire signal to alert a driver of the vehicle that the determined tread depth is below the threshold tread depth; and
wherein the vehicular driving assist system comprises an advanced driving assist system (ADAS) that is operable to at least partially control the vehicle as the vehicle travels along a road, and wherein, based on the determined tread depth being below the threshold tread depth, the ADAS adjusts control of the vehicle as the vehicle travels along the road.

17. The vehicular driving assist system of claim 16, wherein the vehicular driving assist system, based on the determined tread depth of the tread of the tire, determines that the tread of the tire is unevenly worn, and wherein the vehicular driving assist system, responsive to determination that the tread of the tire is unevenly worn, generates an uneven wear signal to alert the driver that the tread of the tire is unevenly worn.

18. The vehicular driving assist system of claim 16, wherein the vehicular driving assist system, based on the determined tread depth of the tire, determines presence of a foreign object at the tread of the tire, and wherein the vehicular driving assist system, responsive to determination of the foreign object at the tread of the tire, generates a tire puncture signal to alert the driver that the tire has been punctured.

19. The vehicular driving assist system of claim 16, wherein the vehicular driving assist system, via processing at the image data processor of image data captured by the camera, determines presence of a coating at the tread of the tire, and wherein the vehicular driving assist system, responsive to determination of the coating at the tread of the tire generates a hazardous driving condition signal to alert the driver to a hazardous driving condition.

20. The vehicular driving assist system of claim 16, comprising a plurality of cameras disposed at the vehicle, wherein each camera of the plurality of cameras is operable to capture image data, and wherein the vehicular driving assist system, via processing at the image data processor of image data captured by the plurality of cameras, determines a respective tread depth of a respective tread of each respective tire of a plurality of tires of the vehicle.

21. The vehicular driving assist system of claim 16, wherein the vehicular driving assist system determines that the determined tread depth is below the threshold tread depth based on a difference between the determined tread depth and a historical tread depth of the tread of the tire stored in memory being greater than a threshold difference.

22. The vehicular driving assist system of claim 16, wherein the vehicular driving assist system, via processing at the image data processor of image data captured by the camera, determines a profile of the detected tread, and wherein the vehicular driving assist system determines the tread depth of the tread of the tire based on a difference between a highest surface measurement along the determined profile and a lowest surface measurement along the determined profile.

23. A vehicular driving assist system, the vehicular driving assist system comprising:
- a sensor disposed at a vehicle equipped with the vehicular driving assist system, wherein the sensor is operable to capture sensor data;
- an electronic control unit (ECU) comprising electronic circuitry and associated software;
- wherein the electronic circuitry of the ECU comprises a data processor for processing sensor data captured by the sensor;
- wherein the vehicular driving assist system, via processing at the data processor of sensor data captured by the sensor, detects a tread of a tire of the vehicle;
- wherein the sensor is mounted at a wheel well of the vehicle, and wherein the sensor comprises a laser sensor that emits a laser beam toward the tread of the tire of the vehicle and that captures sensor data representative of reflection of the laser beam off the tread of the tire;
- wherein the vehicular driving assist system, via processing at the data processor of sensor data captured by the sensor, determines a profile of the detected tread, and wherein the vehicular driving assist system determines a tread depth of the tread of the tire based on a difference between a highest surface measurement along the determined profile and a lowest surface measurement along the determined profile; and
- wherein the vehicular driving assist system, responsive to the determined tread depth being below a threshold tread depth, generates a worn tire signal to alert a driver of the vehicle that the determined tread depth is below the threshold tread depth.

24. The vehicular driving assist system of claim 23, wherein the vehicular driving assist system, based on the determined tread depth of the tread of the tire, determines that the tread of the tire is unevenly worn, and wherein the vehicular driving assist system, responsive to determination that the tread of the tire is unevenly worn, generates an uneven wear signal to alert the driver that the tread of the tire is unevenly worn.

25. The vehicular driving assist system of claim 23, wherein the vehicular driving assist system, based on the determined profile of the tire, determines presence of a foreign object at the tread of the tire, and wherein the vehicular driving assist system, responsive to determination of the foreign object at the tread of the tire, generates a tire puncture signal to alert the driver that the tire has been punctured.

26. The vehicular driving assist system of claim 23, wherein the vehicular driving assist system, via processing at the data processor of sensor data captured by the sensor, determines presence of a coating at the tread of the tire, and wherein the vehicular driving assist system, responsive to determination of the coating at the tread of the tire generates a hazardous driving condition signal to alert the driver to a hazardous driving condition.

27. The vehicular driving assist system of claim 23, wherein the vehicular driving assist system comprises an advanced driving assist system (ADAS) that is operable to at least partially control the vehicle as the vehicle travels along a road, and wherein, based on the determined tread depth being below the threshold tread depth, the ADAS adjusts control of the vehicle as the vehicle travels along the road.

* * * * *